United States Patent [19]
Espenschied et al.

[11] 3,873,060
[45] Mar. 25, 1975

[54] ELECTROMAGNETIC PRESSURE REGULATOR

[75] Inventors: Helmut Espenschied, Ludwigsburg; Wolfgang Gauss, Oeffingen, both of Germany

[73] Assignee: Robert Rosch G.m.b.H., Stuttgart, Germany

[22] Filed: May 24, 1972

[21] Appl. No.: 256,583

[30] Foreign Application Priority Data
May 26, 1971 Germany.............................. 2126045

[52] U.S. Cl............................... 251/129, 251/139
[51] Int. Cl............................................ F16k 31/06
[58] Field of Search..................... 251/129, 331, 139; 137/495

[56] References Cited
UNITED STATES PATENTS

| | | | |
|---|---|---|---|
| 2,461,772 | 2/1949 | Ray | 251/129 |
| 2,619,986 | 12/1952 | Goepfrich | 251/129 |
| 2,842,400 | 7/1958 | Booth et al. | 251/129 X |
| 3,269,689 | 8/1966 | Lee | 251/129 X |
| 3,516,441 | 6/1970 | McCormick | 137/625.61 |
| 3,521,854 | 7/1970 | Leiber et al. | 251/129 |
| 3,531,080 | 9/1970 | Dillon | 251/129 |

FOREIGN PATENTS OR APPLICATIONS

| | | | |
|---|---|---|---|
| 599,652 | 6/1970 | United Kingdom | 251/129 |

Primary Examiner—Arnold Rosenthal
Attorney, Agent, or Firm—Michael S. Striker

[57] ABSTRACT

A pressure regulator in which the pressure is regulated as a function of electrical signals applied to an electromagnet. The armature of the electromagnet actuates a membrane which has one side subjected to the pressure to be regulated. Two passages have their connections controlled by the membrane which closes one of the two passages in operation. The armature is guided by an elastic element whereby substantially little friction is encountered.

16 Claims, 3 Drawing Figures

ELECTROMAGNETIC PRESSURE REGULATOR

BACKGROUND OF THE INVENTION

The present invention relates to an electromagnetic pressure regulator, particularly for use in conjunction with hydraulically operated automatic devices for motor vehicles, and the use of regulating pressure as a function of an operating parameter. A closure device is operated through an armature of an electromagnet. The closure element operates as a function of the pressure of the medium to be regulated. The closure element, furthermore, controls a connection between two connectors within a housing.

An electromagnetic pressure regulator is known in the art, in which an automatic drive arrangement of a motor vehicle has a control pressure dependent upon an electrical input signal. The pressure regulator has a long needle valve connected directly to an armature. This valve needle is guided through leaf springs and guide supports. Such a pressure regulator is not adapted, however to a number of applications, since friction is incurred and this results in inaccurate operation. Furthermore, as a result of the relatively large masses of parts involved in this commonly known regulator, a substantially slow response of operation for regulating pressure is obtained. In this arrangement known in the art, moreover, difficulties are incurred in isolating the electromagnet from the pressurized fluid or medium, since the electromagnet is to operate with the least amount of friction possible. The regulator known in the art is also substantially large and complex, and is not adaptable for pressure regions which differ from each other by large amounts. The conventional pressure regulator is, furthermore, inclined to oscillate, and this is undesirable in operation.

A pressure regulator is further known in the art, in which the armature of an electromagnet in the regulator is guided in a spring membrane, and is thereby free of substantial friction. With this armature, the pressure for a main slider is throttled. With such construction of the electromagnet and the armature, only substantially weak magnetic forces may be obtained, and thereby only substantially low pressures may be regulated. Substantially small comparison forces, moreover, also result in substantially slow response of the pressure regulator. Above all, the basic requirements for the membrane are difficult to realize. Thus, it is difficult on the one hand to obtain an operating membrane without hysteresis for guidance purposes, that will operate elastically. On the other hand, it is essential to maintain the membrane in spring form, for purposes of pressure regulation. It is particularly disadvantageous to construct membranes having concentric or eccentric openings or bores, or to secure to such membranes parts. Such construction of membranes results in inaccurate pressure regulation. In regulators known in the art, furthermore, the membrane does not separate the chamber of the electromagnet from the chamber which is filled with pressurized fluid.

SUMMARY OF THE INVENTION

It is an object of the present invention to provide an electromagnet pressure regulator which operates accurately with rapid response, and is simple in design and compact in construction.

Another object of the present invention is to provide an electromagnetically operated pressure regulator of the foregoing character which may be economically fabricated.

It is a further object of the present invention to provide a pressure regulator, as set forth, which may be readily maintained through its accessible parts.

The objects of the present invention are achieved on the basis that the closure device is in the form of a membrane which borders the space within the housing of the two connections. The membrane is operatively connected to the armature on the side of the membrane facing the chamber, whereby the armature is guided by an elastic element having substantially little friction.

In this manner, the pressure regulator can operate with substantially large comparison surfaces and thereby also with substantially large forces, even though the regulator is of simple design and occupies little space. The resetting force of the spring membrane is independent of the construction of this elastic element, and can be designed so as to achieve guidance without substantial hysteresis. Substantially large accuracy can thereby obtain with rapid response characteristics. At the same time, the membrane leads to a simple construction of the pressure regulator, in which the chamber filled with pressurized fluid is separated from the chamber of the electromagnet.

It is particularly advantageous to have the armature guided in a holding membrane, and in another embodiment, in accordance with the present invention, the armature lies directly against the membrane. In this manner, none of the inaccuracies resulting from frictional effects, are obtained. Furthermore, tipping or devious motion of the armature is also prevented.

A further advantageous construction results when the membrane, holding membrane, armature and nozzle are arranged concentrically with respect to each other. Such design results in a pressure regulator which is particularly simple and compact.

In a still further embodiment of the present invention, the pressure regulator is designed so that the pressure to be regulated increases correspondingly with increase in the electrical input signal. At other times, the pressure drops.

The pressure regulator in accordance with the present invention is particularly adapted for automatic control of motor vehicles, in view of the simple construction and compactness of the regulator. The feature that the regulator, in accordance with the present invention, is also resistant to vibrations is also advantageous for this application. When operating under low pressures, it is desirable that for automatic passenger car arrangements, the pressure side to be regulated is to be connected with the chamber adjacent to the membrane. With commercial vehicle arrangements, on the other hand, having higher operating pressures, it is desirable to connect with the opening in the nozzle, so that the same pressure regulator may be used for substantially different pressure ranges or regions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
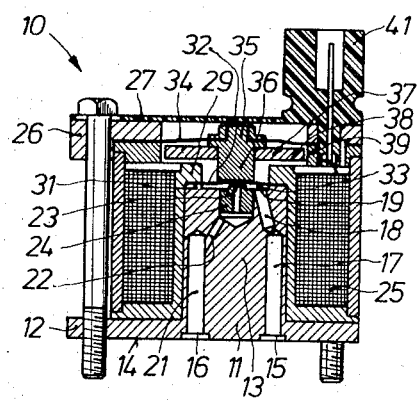
FIG. 1 is a sectional elevational view through a first embodiment of the pressure regulator, in accordance with the present invention.
Figure 2:
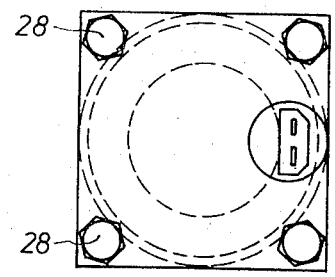
FIG. 2 is a top view of the pressure regulator of FIG. 1.

Referring to the drawing, FIG. 1 shows a pressure regulator 10 having a housing 11 which includes a flange 12 and a cylindrical portion 13. A first connection 15 and a second connection 16 are in a flange surface 14. The first connection 15 communicates with the frontal side 19 of the flange surface 14, through bores 17 and 18. A second connection 16 communicates with an opening 23 in a nozzle 29, through bores 21 and 22. The nozzle 29 is arranged concentrically and interchangeable in a cylindrical portion 13.

A ring-shaped electromagnet 25 is arranged about the cylindrical portion 13. This electromagnet 25 is secured to the housing 11, through a housing plate 26, a cover 27, and four screws 28. The electromagnet 25 has a harness or joint 29 which forms a harness or holding position for a membrane 32, together with a joint or harness 31 at the cylindrical part 13. The membrane 32 is designed in the form of a circular-shaped plate without perforations, and possesses spring properties for purposes of pressure regulation. When in the inoperative position, this membrane assumes a planar shape, and closes more or less an opening 23 situated substantially at the center of a membrane 32. This membrane 32, furthermore, forms in conjunction with the frontal side 19 of the cylindrical portion 13, a chamber 33 which is communicating with the two connections 15 and 16.

A circular-shaped holding membrane 34 is held between the electromagnet 25 and the housing plate 26. This holding membrane 34 has secured to it an armature 35 at its center. The armature 35 lies with an armature rod 36 against the side of the membrane 32 opposite to the chamber 33. The armature rod 36 carries a relatively large circular-shaped armature plate 37 which forms with the electromagnet 25, two substantially large air gaps 38, 39 which are penetrated by magnetic flux.

In the operation of the pressure regulator 10, the pressure regulator serves for regulating pressure in a hydraulic arrangement, dependent upon electrical input signals. For this purpose, the first connection 15 is connected with the pressure side of the hydraulic arrangement which is to be regulated. In this manner, the prevailing pressure within the space 33 may act upon the membrane 32. When the electromagnet 25 is not energized, the armature 35 does not apply any force to the spring membrane 32. As a result, the pressure within the space 33 is substantially correspondingly low. With increasing current, the force of the armature 35 against the membrane 32 increases correspondingly. Since the membrane 32 closes the opening 23 by an increasing amount, the hydraulic pressure within the space 33 rises also thereby. The hydraulic force applied to the membrane 32 and the negligible low spring force of the membrane 32 itself, balance thereby the prevailing force of the armature 35.

Since the armature 35 is held free of friction, and since the closure element itself provides no frictional effects, the current-pressure characteristics of the pressure regulator are not degraded. Through the selection of the magnitudes of the two airgaps 38, 39 (which should not be too small), and through the use of soft ferromagnetic iron, the hysteresis is held substantially small between increasing and decreasing current and associated pressure. This has the advantage that the deflection of the membrane 32 at the opening 23 is very small. Particularly advantageous is the relatively large effective surface of the membrane 32 and the relatively large force which may be realized through the construction of the electromagnet and the armature. With such effective surface of the membrane 32 and relatively large force, the pressure regulator can operate precisely and in a rapid manner. The armature rod 36 which lies against the membrane 32, supports the guidance of the armature 35, and avoids, thereby, any tipping or wrong motion of the armature 35.

It is particularly advantageous to use the pressure regulator, in accordance with the present invention, within the pressure region up to substantially 10 bar or atmospheres. Such pressures are extensively required in automatical control arrangements for passenger-carrying vehicles. This pressure is also effective at the membrane 32, and must be compensated by the electromagnetic force.

The same pressure regulator can be used with the same advantages in arrangements utilizing pressures up to substantially 200 bar or atmospheres, as may be encountered in cargo-carrying vehicles control arrangements. For this purpose, the second connection 16 is made to communicate with the pressure side of the hydraulic arrangement which is to be regulated, whereas the first connection 15 is made to communicate with the return line. This higher pressure is then no longer effective upon the entire surface of the membrane 32. This surface corresponds to the basic surface for the hydraulic force, and corresponds substantially to the cross-section of the opening 23 in this application.

Figure 3:
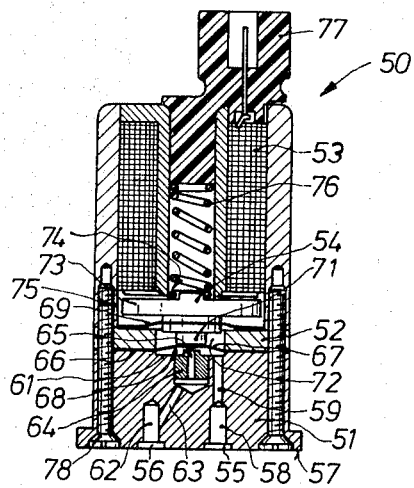
FIG. 3 is a sectional view and shows the assembled operating parts of a second embodiment of the pressure regulator, in accordance with the present invention.

FIG. 3 shows a second embodiment of the pressure regulator 50, in accordance with the present invention. In this second embodiment, the pressure regulator 50 has a housing 51, an intermediate plate 52, and an electromagnet 53 with armature 54.

The housing 51 has a first connection 55 and a second connection 56 in a flange surface 57. Bores 58 and 59 communicate with the first connection 55 and a frontal surface 61 lying opposite the flange surface 57. The second connection 56 is made to communicate with an opening 65 in a nozzle 64, through bores 62 and 63. The intermediate plate 52 contacts a rim 66 of the frontal surface 61. The spring membrane 67 is clamped between the two parts. The membrane 67 forms with the frontal surface 61, a chamber 68 which is closed to the exterior, and which is connectable with the connections 55 and 56. On the other side of the intermediate plate 52, is the electromagnet 53, and a holding membrane 69 for the armature 54 is held between the two parts. The armature 54 projects with its armature rod 71 into a recess 72 in the intermediate plate 52, and lies against the side of the membrane 67 facing away from chamber 68. The armature rod 71 carries the disc-shaped armature plate 73, which form two airgaps 74 and 75, in conjunction with the electromagnet 53. Centrally located with the electromagnet 53, is a spring 76 which lies against the electromagnet 53 itself and against the armature 54. The connections of the electromagnet 53 are brought out through a connecting nipple 77. Four screws 78 maintain assembled the housing 51, the intermediate plate 52 and the electromagnet 53. In this assembled manner, the holding membrane 69, the membrane 67, the armature 54 and the opening 65 are arranged coaxially.

The functional operation of the pressure regulator 50 corresponds in principle to that of the pressure regulator 10. There is, however, a difference in the respect that the spring 76 presses on the membrane 67 and closes the opening 65 when the electromagnet 53 is not energized. Consequently, when the electromagnet 53 is not energized, the maximum pressure within the first connection 55 is throttled, and with increasing current, the prevailing pressure within the connection 55 drops.

The pressure regulator 50 can be used for control arrangements under different pressure regions, similar to that described in relation to the pressure regulator 10 of FIG. 1. Under these conditions and applications, the pressure side of the arrangement to be regulated is connected to the first connection 35 at low pressures, and when high pressures prevail, the second connection 56 communicates with the pressure side of the arrangement to be regulated.

The pressure regulators 10 and 15 are particularly compact and simple in design, compared to conventional pressure regulators having comparable accuracy and rapid response in operation.

It is also possible to adapt the pressure regulator described for hydraulic applications, in accordance with the present invention, to pneumatic applications by selecting the proper design parameters for this purpose. Such use of the arrangement of the present invention for pneumatic purposes can be achieved, in this manner, without deviating from the underlying concepts of the invention.

It will be understood that each of the elements described above, or two or more together, may also find a useful application in other types of pressure regulators differing from the types described above.

While the invention has been illustrated and described as embodied in a pressure regulator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of a prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A pressure regulator for regulating the pressure in a hydraulic circuit, comprising, in combination, a valve housing having an interior bounded by an interior wall and two ports opening into said interior of said valve housing and being bounded by surface portions of said interior wall, the surface portion bounding at least one of said ports constituting a valve seat; elastic separating means comprising an elastic separating diaphragm mounted in said interior of said valve housing and dividing said interior of said valve housing into a first chamber and a second chamber located on opposite sides of said elastic diaphragm, said ports opening into said first chamber, and said separating means being a continuous unbroken separating means completely preventing flow of fluid out of said first chamber into said second chamber; an armature located in said second chamber; mounting means mounting said armature for movement from a first position in which said armature presses said elastic separating means into sealing contact with said valve seat, thereby preventing fluid communication between said ports, to a second position in which said armature does not press said elastic separating means into sealing contact with said valve seat, thereby permitting fluid communication between said ports; and electromagnetic means mounted on said housing and operative when energized for moving said armature from one to the other of said positions thereof, said mounting means comprising a further elastic diaphragm constituting an elastic mounting diaphragm mounted in said interior of said valve housing and furthermore supporting and guiding said armature for movement between said first and second positions thereof.

2. A pressure regulator as defined in claim 1, wherein said further elastic diaphragm is generally planar and oriented transverse to the path of movement of said armature.

3. A pressure regulator as defined in claim 1, wherein said armature is supported intermediate said first and second positions thereof exclusively by said further elastic diaphragm.

4. A pressure regulator as defined in claim 1, wherein the centers of said separating diaphragm, of said mounting diaphragm, of said armature and of said valve seat are in alignment.

5. A pressure regulator as defined in claim 4, wherein said valve housing has a removable part provided with a surface constituting said valve seat and provided with a nozzle passage constituting at least part of said one of said ports.

6. A pressure regulator as defined in claim 1, wherein said electromagnetic means is located in said second chamber, whereby fluid flowing into said first chamber through the other of said ports cannot flow past said elastic separating means to reach said electromagnetic means in said second chamber.

7. A pressure regulator as defined in claim 1, wherein said electromagnetic means comprises means operative for causing said armature to move said separating means closer to and farther from said valve seat in dependence upon the energization of said electromagnetic means to establish a substantially proportional relationship between the pressure of fluid in said first chamber and the energization of said electromagnetic means.

8. A pressure regulator as defined in claim 1, wherein said valve housing comprises a cylindrical portion provided at one end face thereof with an annular radially outwardly extending flange portion, said two ports each passing through said cylindrical portion and having respective first ends located in the plane of said one end face and having respective second ends located at the other end face of said cylindrical portion, said first chamber being defined by said separating means and said other end face of said cylindrical portion.

9. A pressure regulator as defined in claim 1, wherein said valve housing is comprised of two adjoining portions having facing surfaces between which is clamped the peripheral portion of said mounting diaphragm.

10. A pressure regulator as defined in claim 1, wherein said valve housing is comprised of two adjoining portions having facing surfaces between which is clamped the peripheral portion of said elastic separating diaphragm.

11. A pressure regulator as defined in claim 1, wherein said armature is comprised of two armature sections, and wherein the peripheral portion of said mounting diaphragm is sandwiched between said two armature sections.

12. A pressure regulator as defined in claim 1, and further including biasing spring means for normally urging said armature towards said first position thereof, and wherein said electromagnetic means comprises means operative for moving said armature towards said second position thereof to an extent dependent upon the energization of said electromagnetic means to establish a substantially inversely proportional relationship between the pressure of fluid in said first chamber and the energization of said electromagnetic means.

13. A pressure regulator as defined in claim 12, wherein said electromagnetic means comprises an annular cylindrical electromagnet and wherein said biasing means comprises a spring positioned in the interior of said annular cylindrical electromagnet and biasing said armature towards said first position thereof, both said electromagnet and said spring being located on the side of said separating diaphragm opposite the side of said separating diaphragm which faces said first chamber, and wherein said valve housing includes a housing portion located on the side of said separating diaphragm facing said first chamber and wherein such housing portion contains two passageways consituting said two ports.

14. A pressure regulator as defined in claim 1, wherein said valve housing is comprised of a first portion and a second portion having respective facing surfaces, and wherein the peripheral portion of said separating diaphragm is clamped between said facing surfaces, and wherein said valve housing is further comprised of a third portion, said second and third portions having respective facing surfaces, and wherein the peripheral portion of said mounting diaphragm is clamped between said facing surfaces of said second and third portions, and wherein said electromagnetic means comprises an annular electromagnet located in said second chamber, with said mounting diaphragm being positioned intermediate said electromagnet and said separating diaphragm.

15. A pressure regulator as defined in claim 1, wherein said armature is movable into contact with a portion of the surface of said separating means for pressing the latter against said valve seat but wherein said armature and said separating means are not fixedly connected to each at the contacting surface portion of said armature and of said separating means.

16. A pressure regulator for regulating the pressure in a hydraulic circuit, comprising, in combination, a valve housing having an interior bounded by an interior wall and two ports opening into said interior of said valve housing and being bounded by surface portions of said interior wall, the surface portion bounding at least one of said ports constituting a valve seat; elastic separating means comprising an elastic separating diaphragm mounted in said interior of said valve housing and dividing said interior of said valve housing into a first chamber and a second chamber located on opposite sides of said elastic diaphragm, said ports opening into said first chamber, and said separating means being a continuous unbroken separating means completely preventing flow of fluid out of said first chamber into said second chamber; an armature located in said second chamber; mounting means mounting said armature for movement from a first position in which said armature presses said elastic separating means into sealing contact with said valve seat, thereby preventing fluid communication between said ports, to a second position in which said armature does not press said elastic separating means into sealing contact with said valve seat, thereby permitting fluid communication between said ports; and electromagnetic means mounted on said housing and operative when energized for moving said armature from one to the other of said positions thereof, said electromagnetic means comprising an annular electromagnet and wherein said armature comprises a plate of magnetically conductive material positioned in proximity to one axial end of said annular electromagnet to form with such axial end an annular air gap.

* * * * *